United States Patent
Masuda et al.

(10) Patent No.: US 7,602,540 B2
(45) Date of Patent: Oct. 13, 2009

(54) OPTICAL DEFLECTOR, OPTICAL SCANNER, AND IMAGE FORMING APPARATUS

(75) Inventors: Kensuke Masuda, Tokyo (JP); Yukio Itami, Kanagawa (JP); Yoshihiro Takahashi, Miyagi (JP); Tomotaka Takamura, Miyagi (JP)

(73) Assignees: Ricoh Company, Limited, Tokyo (JP); Tohoku Ricoh CC., Ltd., Shibata-gun (JP)

( * ) Notice: Subject to any disclaimer, the term of this patent is extended or adjusted under 35 U.S.C. 154(b) by 0 days.

(21) Appl. No.: 12/370,019

(22) Filed: Feb. 12, 2009

(65) Prior Publication Data

US 2009/0231659 A1 Sep. 17, 2009

(30) Foreign Application Priority Data

Mar. 13, 2008 (JP) .............................. 2008-064871

(51) Int. Cl.
*G02B 26/08* (2006.01)
(52) U.S. Cl. .............. 359/200.1; 359/200.2; 359/204.1; 359/216.1
(58) Field of Classification Search ........................ None
See application file for complete search history.

(56) References Cited

U.S. PATENT DOCUMENTS

| | | | |
|---|---|---|---|
| 5,069,515 A | 12/1991 | Itami et al. | |
| 5,726,699 A | 3/1998 | Itami et al. | |
| 5,739,602 A | 4/1998 | Suzuki et al. | |
| 5,769,544 A | 6/1998 | Suzuki et al. | |
| 6,580,186 B1 | 6/2003 | Suzuki et al. | |
| 6,749,339 B1 * | 6/2004 | Murabe et al. | 384/100 |
| 6,778,203 B2 | 8/2004 | Itami et al. | |
| 6,822,775 B2 | 11/2004 | Suzuki et al. | |
| 7,126,737 B2 | 10/2006 | Atsuumi et al. | |
| 7,420,723 B2 | 9/2008 | Itami et al. | |
| 2006/0061847 A1 | 3/2006 | Itami | |
| 2006/0208179 A1 | 9/2006 | Itami | |
| 2007/0146852 A1 | 6/2007 | Itami | |
| 2008/0174843 A1 | 7/2008 | Masuda et al. | |
| 2008/0204539 A1 | 8/2008 | Itami et al. | |
| 2008/0212999 A1 | 9/2008 | Masuda et al. | |
| 2008/0239432 A1 | 10/2008 | Itami | |
| 2008/0259424 A1 | 10/2008 | Itami et al. | |

FOREIGN PATENT DOCUMENTS

| JP | 2005-10260 | 1/2005 |
|---|---|---|
| JP | 2005-92129 | 4/2005 |
| WO | WO 01/65560 A1 | 9/2001 |

* cited by examiner

*Primary Examiner*—James Phan
(74) *Attorney, Agent, or Firm*—Oblon, Spivak, McClelland, Maier & Neustadt, L.L.P.

(57) ABSTRACT

An optical deflector includes a rotary body including a polygon mirror; a rotation shaft fixed to the rotary body; a bearing unit rotatably supporting the rotation shaft; and a board to which the bearing unit is fixed. Where P [rpm] is the number of revolutions of the rotary body, l [m] is a distance between a center of gravity of the rotary body and the board, m [kg] is mass of the rotary body, r [m] is a radius of the rotation shaft, E [Pa] is Young's modulus of the rotation shaft, and t [mm] is a thickness of the board, the following inequalities are satisfied:

$$\frac{1}{2\pi}\sqrt{\frac{3\pi E r^4}{4\,ml^3}} \le \sqrt{2} \times \frac{P}{60} \text{ and } 0.8 \le t \le 1.8.$$

16 Claims, 8 Drawing Sheets

OPTICAL DEFLECTOR, OPTICAL SCANNER, AND IMAGE FORMING APPARATUS

CROSS-REFERENCE TO RELATED APPLICATIONS

The present application claims priority to and incorporates by reference the entire contents of Japanese priority document 2008-064871 filed in Japan on Mar. 13, 2008.

BACKGROUND OF THE INVENTION

1. Field of the Invention

The present invention relates to an optical deflector, an optical scanner that includes the optical deflector, and an image forming apparatus that includes the optical scanner.

2. Description of the Related Art

In the field of image forming apparatuses, such as copiers, facsimile machines, and printers that form images by converting electric data into optical data, forming based on the optical data an electrostatic latent image on an image carrier by an optical scanner, and developing the electrostatic latent image into a toner image, the high-speed and high-density image formation is required in addition to the full-color image formation.

To satisfy such needs, some manufacturers increases the number of polygon mirrors that are used in an optical deflector of the optical scanner, or increases rotation speed of the optical deflector. However, the increase in the number of the polygon mirrors or the increase in the rotation speed disadvantageously causes increase in vibration and noise, which are due to eccentricity of the polygon mirrors, wind roar, which is due to friction with ambient air, and temperature.

To solve the problems, Japanese Patent Application Laid-open No. 2005-092129 discloses an optical deflector, which is used in a full-color image forming apparatus, for achieving high-speed and high-density scanning. The optical deflector includes a plurality of small-size polygon mirrors tightly connected to each other. Because the polygon mirrors are tightly connected to each other, the optical deflector generates less noise even during high-speed rotation, and the polygon mirrors scarcely deviate from each other due to acceleration and temperature change.

Even in the optical deflector disclosed in Japanese Patent Application Laid-open No. 2005-092129, strong vibration may occur due to resonance when the rotation frequency increases close to a natural frequency of the optical deflector as the rotation speed increases. The strong vibration may cause deviation of a deflected beam and decrease quality of an output image. To solve the problem, Japanese Patent Application Laid-open No. 2005-010260 and Japanese Patent Application Laid-open No. 2001-065560 disclose technologies for suppressing the vibration by using a dynamic absorber.

However, such technologies increase the cost for the additional parts. Moreover, because an enough-large dynamic absorber cannot be used, the vibration is not suppressed to a large extent.

SUMMARY OF THE INVENTION

It is an object of the present invention to at least partially solve the problems in the conventional technology.

According to an aspect of the present invention, there is provided an optical deflector including: a rotary body that includes a polygon mirror; a rotation shaft that is fixed to the rotary body and rotates together with the rotary body; a bearing unit that rotatably supports the rotation shaft; and a board to which the bearing unit is fixed, wherein the following inequalities are satisfied:

$$\frac{1}{2\pi}\sqrt{\frac{3\pi E r^4}{4 \, \mathrm{ml}^3}} \le \sqrt{2} \times \frac{P}{60} \text{ and } 0.8 \le t \le 1.8,$$

where P [revolution per minute] is number of revolutions of the rotary body, l [meter] is a distance between a center of gravity of the rotary body and the board, m [kilogram] is mass of the rotary body, r [meter] is a radius of the rotation shaft, E [pascal] is Young's modulus of the rotation shaft, and t [millimeter] is a thickness of the board.

According to another aspect of the present invention, there is provided an optical deflector including: a rotary body that includes a polygon mirror; a rotation shaft that is fixed to the rotary body and rotates together with the rotary body; a bearing unit that rotatably supports the rotation shaft; and a board to which the bearing unit is fixed, wherein the following inequalities are satisfied:

$$\frac{1}{2\pi}\sqrt{\frac{3\pi r^4}{4 \, \mathrm{ml}^3}} \le 5.41 \times 10^{-8} \times P \text{ and } 0.8 \le t \le 1.8,$$

where P [revolution per minute] is number of revolutions of the rotary body, l [meter] is a distance between a center of gravity of the rotary body and the board, m [kilogram] is mass of the rotary body, r [meter] is a radius of the rotation shaft, and t [millimeter] is a thickness of the board.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
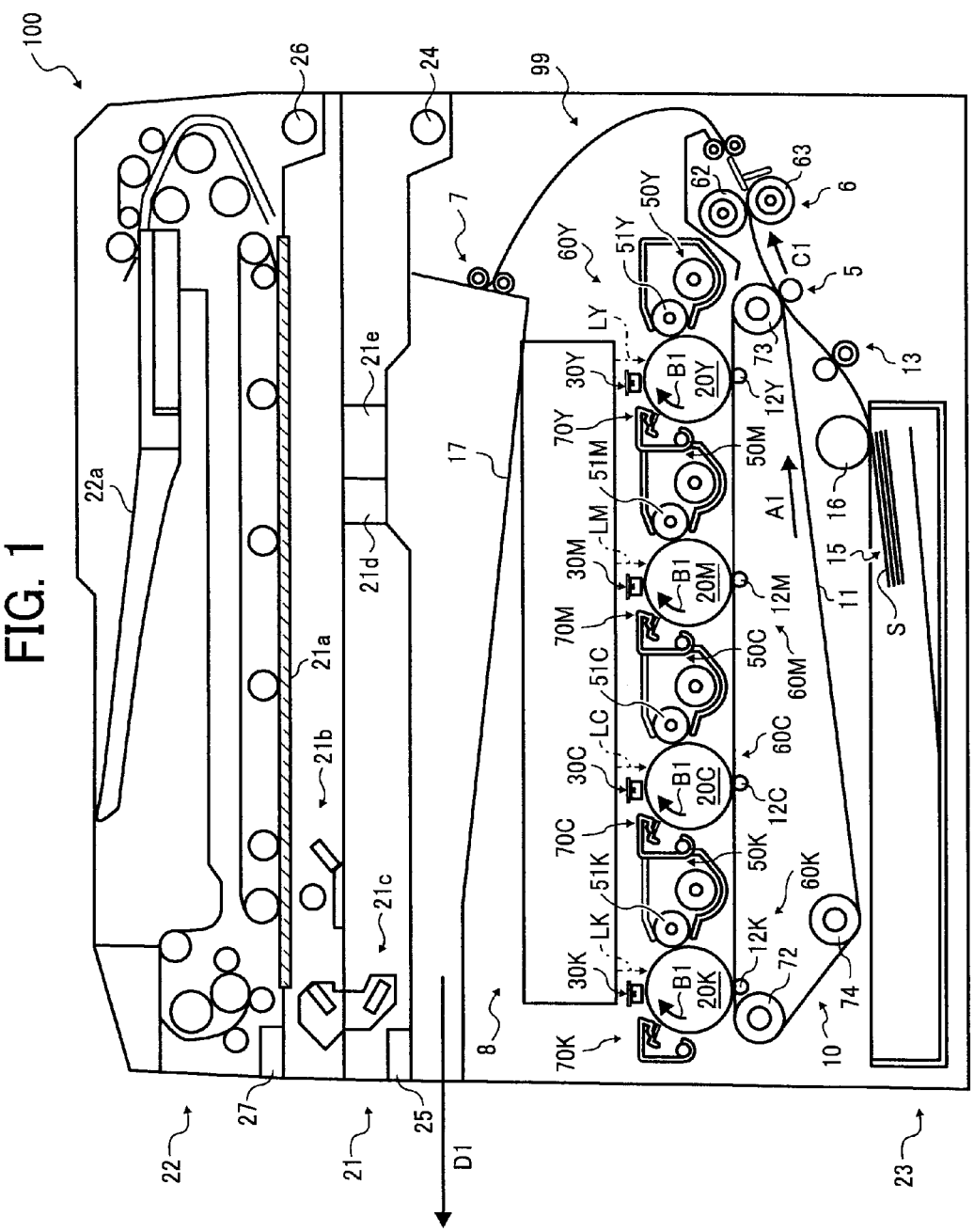
FIG. 1 is a schematic diagram of an image forming apparatus according to an embodiment of the present invention.

FIG. 1 is a schematic diagram of an image forming apparatus 100 according to an embodiment of the present invention. The image forming apparatus 100 is a multifunctional product (MFP) having various functions such as a copier, a printer, and a facsimile machine. The image forming apparatus 100 forms a full-color image. When the image forming apparatus 100 is used as the printer or the facsimile machine, the image forming apparatus 100 receives image signals as image data from an external device, and forms an image based on the received image signals.

The image forming apparatus 100 can form the image on various types of sheet-like recording media including plain paper sheets that are widely used as copy sheets, overhead projector (OHP) sheets, thick sheets such as cards and post cards, and envelopes.

The image forming apparatus 100 includes a main body 99, a scanner 21 that scans an original, an automatic document feeder (ADF) 22 that feeds the original from a tray of the ADF 22 to the scanner 21, and a sheet feeder 23 as a sheet-feed table that stores therein recording sheets S as recording media and feeds the recording sheet S toward a secondary-transfer position. The ADF 22, the scanner 21, the main body 99, and the sheet feeder 23 are arranged in this order from top to bottom.

The image forming apparatus 100 is a tandem-type image forming apparatus. In other words, four photosensitive elements 20Y, 20M, 20C, and 20K, each of which is a photoconductor in a cylindrical shape, are aligned parallel to each other. The photosensitive elements 20Y, 20M, 20C, and 20K are used as image carriers for carrying a yellow image, a magenta image, a cyan image, and a black image, respectively.

The photosensitive elements 20Y, 20M, 20C, and 20K have the same diameter. The photosensitive elements 20Y, 20M, 20C, and 20K are arranged with a constant interval therebetween on an upper side of an outer surface of an intermediate transfer belt 11. The intermediate transfer belt 11 is an endless belt and is arranged near the center inside the main body 99.

The photosensitive elements 20Y, 20M, 20C, and 20K are arranged in this order, with the photosensitive element 20Y being most-upstream with respect to a belt-rotation direction indicated by an arrow A1 in FIG. 1. The photosensitive elements 20Y, 20M, 20C, and 20K are included in four image stations 60Y, 60M, 60C, and 60K, respectively. The image stations 60Y, 60M, 60C, and 60K form the yellow image, the magenta image, the cyan image, and the black image, respectively.

The intermediate transfer belt 11 rotates in the A1 direction while opposing the photosensitive elements 20Y, 20M, 20C, and 20K. Toner images that are formed on the photosensitive elements 20Y, 20M, 20C, and 20K as visible images are transferred onto the intermediate transfer belt 11 that is rotating in the A1 direction in a superimposed manner. After that, the superimposed toner images are collectively transferred onto the recording sheet S.

For superimposing the toner images at the same position onto the intermediate transfer belt 11 that is rotating in the A1 direction, the toner images are transferred from the photosensitive elements 20Y, 20M, 20C, and 20K onto the intermediate transfer belt 11 at different timing, in other words, the toner images are transferred sequentially from the upstream side. Four primary-transfer rollers 12Y, 12M, 12C, and 12K as transfer chargers are arranged in positions to nip the intermediate transfer belt 11 with the photosensitive elements 20Y, 20M, 20C, and 20K, respectively. The toner images are transferred at primary-transfer positions, i.e., the nip positions by using a voltage that is applied by the primary-transfer rollers 12Y, 12M, 12C, and 12K.

In the present embodiment, all layers of the intermediate transfer belt 11 are made of an elastic material such as rubber. However, a belt having only one elastic layer, a belt part of which is made of an elastic material, or a non-elastic belt can be used as the intermediate transfer belt 11. It is allowable to use other materials such as fluorine-based resin, polycarbonate resin, and polyimide resin instead of rubber.

The image forming apparatus 100 includes the image stations 60Y, 60M, 60C, and 60K, an intermediate-transfer-belt unit 10 that includes the intermediate transfer belt 11, and a secondary-transfer roller 5. The intermediate-transfer-belt unit 10 is arranged under the photosensitive elements 20Y, 20M, 20C, and 20K. The secondary-transfer roller 5 is in contact with the outer surface of the intermediate transfer belt 11, and rotates in a direction same as the belt-rotation direction of the intermediate transfer belt 11 at the contact position. The secondary-transfer roller 5 is transfers the toner image from the intermediate transfer belt 11 to the recording sheet S.

The image forming apparatus 100 includes an intermediate-transfer-belt cleaning unit (not shown) including a cleaning blade (not shown), and an optical scanning unit 8 as a writing unit. The cleaning blade is arranged in contact with the intermediate transfer belt 11 to clean the outer surface of the intermediate transfer belt 11. The optical scanning unit 8 is arranged above the image stations 60Y, 60M, 60C, and 60K.

The image forming apparatus 100 further includes a pair of registration rollers 13 and a sensor (not shown). The registration rollers 13 receive the recording sheet S from the sheet feeder 23 and convey the recording sheet S to between the intermediate transfer belt 11 and the secondary-transfer roller 5, i.e., the secondary-transfer position at proper timing in synchronization with the timing of forming the toner images by the image stations 60Y, 60M, 60C, and 60K. The sensor is used for determining whether a trailing end of the recording sheet S is conveyed to the registration rollers 13.

The image forming apparatus 100 includes a fixing unit 6, a discharge roller 7, a catch tray 17, and toner bottles (not shown). Each of the toner bottles is filled with a corresponding one of a yellow toner, a magenta toner, a cyan toner, and a black toner. After the full-color toner image is transferred onto the recording sheet S, the recording sheet S is conveyed in a direction indicated by a C1 arrow in FIG. 1 to the fixing unit 6. The fixing unit 6 then fixes the full-color toner image onto the recording sheet S. After that, the recording sheet S is discharged by the discharge roller 7 out of the main body 99 onto the catch tray 17.

The catch tray 17 is arranged in the middle of the image forming apparatus 100, more particularly, on an upper surface of the main body 99 and under the scanner 21. The recording sheet S is taken away from the catch tray 17 in a direction indicated by a D1 arrow.

The intermediate-transfer-belt unit 10 includes, in addition to the intermediate transfer belt 11, the primary-transfer rollers 12Y, 12M, 12C, and 12K, a driving roller 72, a secondary-transfer roller 73 that makes a pair with the secondary-transfer roller 5, and a support roller 74 as a driven roller. The intermediate transfer belt 11 is supported by the driving roller 72, the secondary-transfer roller 73, and the support roller 74. The driving roller 72 is driven to rotate by a driving source (not shown) such as a motor. This rotation causes the intermediate transfer belt 11 to rotate in the A1 direction.

The fixing unit 6 includes a fixing roller 62 that includes a heat source inside thereof, and a pressure roller 63 that makes a nip with the fixing roller 62. When the recording sheet S with the full-color toner image transferred thereon is passed through the nip, i.e., between the fixing roller 62 and the pressure roller 63, the full-color toner image is fixed onto a surface of the recording sheet S by heat and pressure.

The optical scanning unit 8 emits, based on the image signals, laser beams LY, LM, LC, and LY to the photosensitive elements 20Y, 20M, 20C, and 20K, thereby scanning scan target surfaces of the photosensitive elements 20Y, 20M, 20C, and 20K. Thus, electrostatic latent images are formed on the scan target surfaces that are exposed to the beams. The beams LY, LM, LC, and LY indicate the optical data that is converted from the electric data corresponding to the desired images to be formed. The optical scanning unit 8 forms, based on the optical data, the electrostatic latent images on the photosensitive elements 20Y, 20M, 20C, and 20K.

The optical scanning unit 8 is detachable from the main body 99. If the optical scanning unit 8 is detached, the user can independently remove later-described process cartridges of the image stations 60Y, 60M, 60C, and 60K from the main body 99 by taking them out upward.

The sheet feeder 23 includes a sheet-feed tray 15 in which the recording sheets S are stacked and a sheet-feed roller 16 that feeds the recording sheet S from the sheet-feed tray 15.

The scanner 21, which is above the main body 99, is attached to the main body 99 rotatably around a shaft 24 that is arranged on an upstream side with respect to the D1 direction. Thus, the scanner 21 is movable between an open position and a close position against the main body 99.

The scanner 21 is provided with a handle 25 on a downstream side with respect to the D1 direction. When the user wishes to open the scanner 21, the user holds the handle 25 and upwardly rotates the scanner 21 to the open position. An angle between the scanner 21 in the open position and the main body 99 is about 90 degrees. Therefore, the user can easily perform various operations such as access to the units inside the main body 99 and closing of the scanner 21.

The scanner 21 includes an exposure glass 21a on which the original is placed, a first carrier 21b including a first reflector (not shown), a second carrier 21c including a second reflector (not shown), an imaging lens 21d, and a scanning sensor 21e. When a light source (not shown) emits light to the original on the exposure glass 21a, the light is reflected from the original to the first reflector. The first carrier 21b is movable from side to side to receive the reflected light. The light is then reflected from the first reflector to the second reflector, and further reflected from the second reflector to the imaging lens 21d. Passed through the imaging lens 21d, the light forms an image. The scanning sensor 21e receives the light passed through the imaging lens 21d, and scans contents of the original.

The ADF 22, which is arranged above the scanner 21, is attached to the scanner 21 rotatably around a shaft 26 that is arranged on the upstream side with respect to the D1 direction. Thus, the ADF 22 is movable between an open position and a close position against the scanner 21.

The ADF 22 is provided with a handle 27 on the downstream side with respect to the D1 direction. When the user wishes to open the ADF 22, the user holds the handle 27 and upwardly rotates the ADF 22 to the open position. When the ADF 22 is opened, the exposure glass 21a is exposed.

The ADF 22 includes a document tray 22a on which the original is placed and a driving unit (not shown) including a motor or the like. The driving unit feeds the original from the document tray 22a. When the user wishes to copy the original by using the image forming apparatus 100, the user places the original on the document tray 22a. Alternatively, the user opens the ADF 22, places the original on the exposure glass 21a, and closes the ADF 22. An angle between the ADF 22 in the open position and the scanner 21 is about 90 degrees. Therefore, the user can easily perform various operations such as placing of the original on the exposure glass 21a and maintenance for the exposure glass 21a.

The structure of the image station 60Y including the photosensitive element 20Y is described with reference to FIG. 1. The image stations 60Y, 60M, 60C, and 60K have substantially the same structure, and the same description about the other three photosensitive elements is not repeated. Components of the other three photosensitive elements corresponding to those of the image station 60Y are denoted with the same reference numerals except for the letters attached to the end. The letters of Y, M, C, and K means that the component is used for forming an image in the colors of yellow, magenta, cyan, and black, respectively.

The image station 60Y includes the primary-transfer roller 12Y, a cleaning unit 70Y that cleans the photosensitive element 20Y, a charging unit 30Y that charges the photosensitive element 20Y with a high voltage, and a developing unit 50Y that develops the toner image on the photosensitive element 20Y. Those units are arranged around the photosensitive element 20Y in this order with the primary-transfer roller 12Y being most-upstream with respect to the clockwise rotation direction, i.e., the B1 direction. The developing unit 50Y includes a developing roller 51Y that is in position to make a contact with the photosensitive element 20Y.

The photosensitive element 20Y, the cleaning unit 70Y, the charging unit 30Y, and the developing unit 50Y form the process cartridge as a unit. The process cartridge is detachable from the main body 99. This unit structure as the process cartridge has a remarkable advantage in maintenance, because a used process cartridge can be replaced with a new one easily.

In this manner, as the photosensitive element 20Y rotates in the B1 direction, the surface of the photosensitive element 20Y is charged evenly by the charging unit 30Y, and then the electrostatic latent image for yellow is formed on the photosensitive element 20Y through the exposure to the beam LY coming from the optical scanning unit 8. The photosensitive element 20Y is scanned in both the main-scanning direction that is perpendicular to the plane of FIG. 1 and the sub-scanning direction parallel to the circumferential direction of the photosensitive element 20Y. To scan in the main-scanning direction, the beam LY moves in the main-scanning direction. To scan in the sub-scanning direction, on the other hand, the photosensitive element 20Y rotates in the B1 direction.

After that, the electrostatic latent image is developed to the yellow image with the charged yellow toner by the developing unit 50Y. The yellow image is primarily-transferred by the primary-transfer roller 12Y onto the intermediate transfer belt 11 that is rotating in the A1 direction. After the primary transfer, the cleaning unit 70Y scratches and removes the residual toner or the like from the photosensitive element 20Y, and then stores therein the residual toner or the like. The photosensitive element 20Y is charged by the charging unit 30Y again.

The magenta image, the cyan image, and the black image are formed on the other photosensitive elements 20M, 20C, and 20K, respectively in the same manner. The three toner images are primarily-transferred by the primary-transfer rollers 12M, 12C, and 12K onto the same position of the intermediate transfer belt 11 at which the yellow image is transferred, as the intermediate transfer belt 11 rotates in the A1 direction. Thus, the full-color toner image is formed on the intermediate transfer belt 11.

The full-color toner image is conveyed to the secondary-transfer position near the secondary-transfer roller 5, as the intermediate transfer belt 11 rotates in the A1 direction. The full-color toner image is secondarily-transferred onto the recording sheet S at the secondary-transfer position.

When the recording sheet S is conveyed from the sheet feeder 23 to between the intermediate transfer belt 11 and the secondary-transfer roller 5, the registration rollers 13 adjust the timing to convey the recording sheet S based on the detection signal received from the sensor so that the leading end of the recording sheet S and the front end of the full-color toner image that is formed on the intermediate transfer belt 11 enter the secondary-transfer position at the same timing.

After the full-color toner image is transferred onto the recording sheet S, the recording sheet S is conveyed in the C1 direction to the fixing unit 6. The full-color toner image is then fixed onto the recording sheet S by heat and pressure, when the recording sheet S is passed between the fixing roller 62 and the pressure roller 63. Thus, the full-color toner image is fixed on the recording sheet S. After that, the recording sheet S with the fixed full-color toner image is discharged by the discharge roller 7 onto the catch tray 17. On the other hand, the intermediate transfer belt 11 is cleaned by the intermediate-transfer-belt cleaning unit for the next primary transfer.

To implement the high-speed image formation, the optical scanning unit 8 writes the electrostatic latent images on the surfaces of the photosensitive elements 20Y, 20M, 20C, and 20K at high speed. More particularly, the optical scanning unit 8 implements the high-speed writing with a plurality of polygon mirrors rotating at high speed.

The structure of the optical scanning unit 8 is described below. It is noted that the rotation speed of the photosensitive elements 20Y, 20M, 20C, and 20K, the rotation speed of the intermediate transfer belt 11, the conveying speed of the recording sheet S, and the like increase as the writing speed of the optical scanning unit 8 increases.

Figure 2:
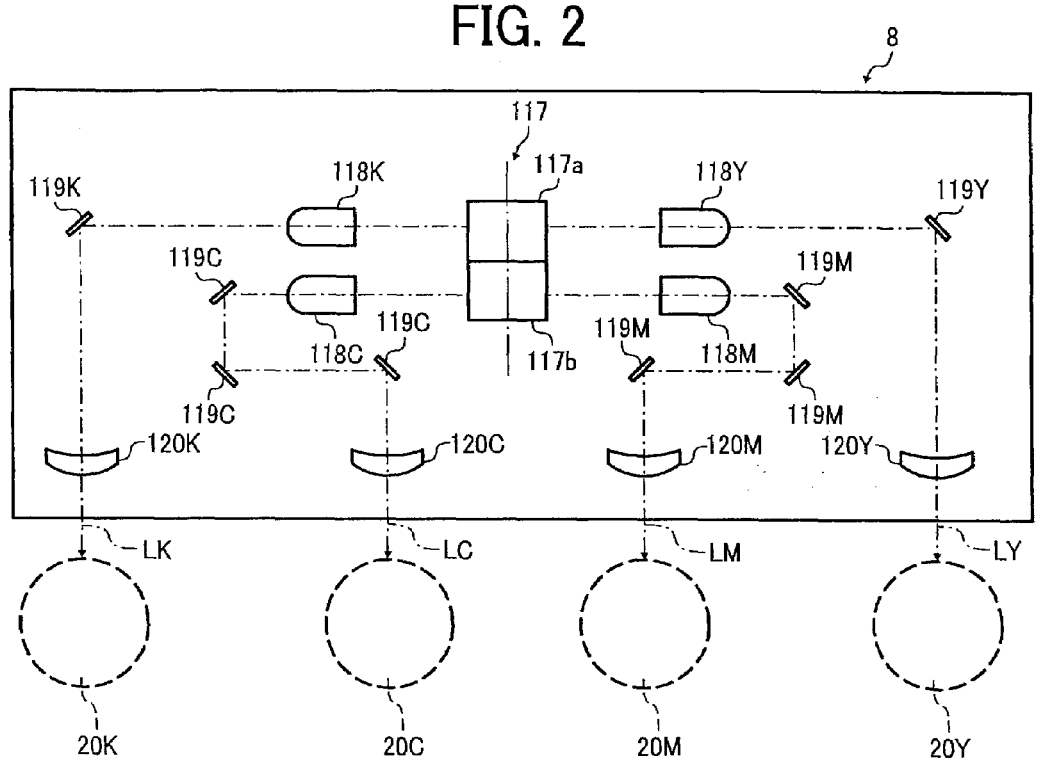
FIG. 2 is a schematic diagram of relevant parts of an optical scanning unit of the image forming apparatus and its peripherals.
Figure 8:
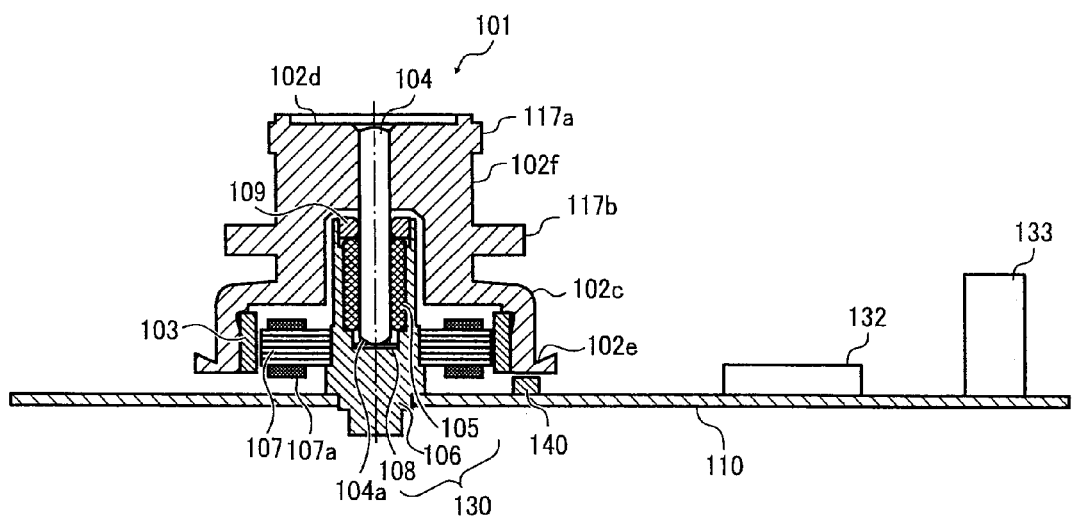
FIG. 8 is a cross-sectional view of the optical deflector.
Figure 9:
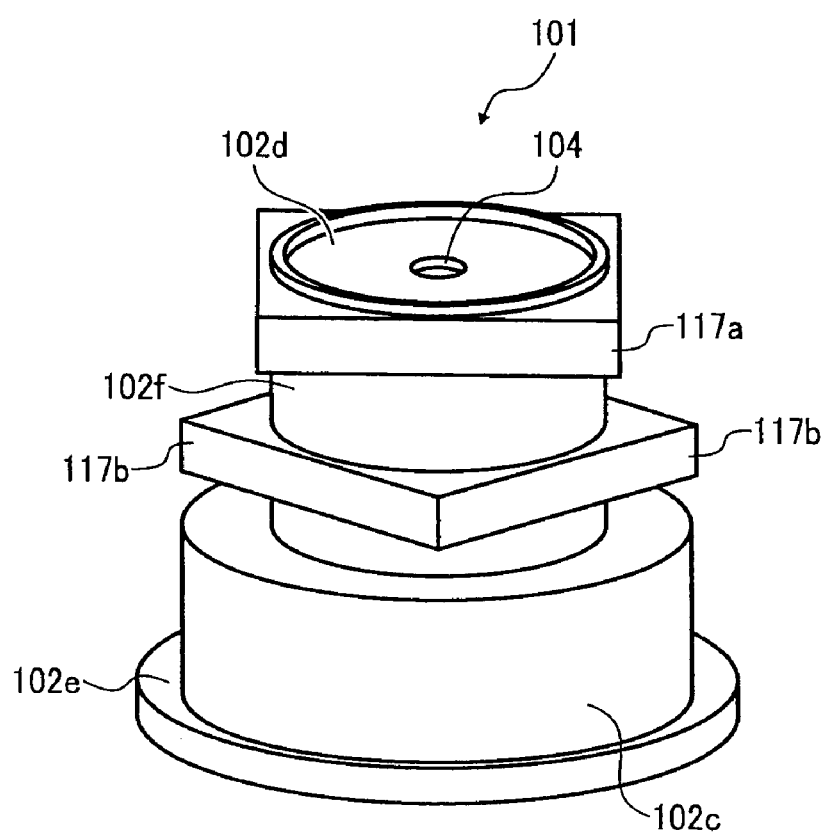
FIG. 9 is a perspective view of relevant parts of the optical deflector.

FIG. 2 is a schematic diagram of the optical scanning unit 8, viewed from the same direction as that in FIG. 1. The optical scanning unit 8 includes an optical deflector 117. The structure of the optical scanning unit 8 is symmetric with respect to the optical deflector 117. The structure of the optical deflector 117 is described in detail later with reference to FIGS. 8 to 10.

Figure 3:
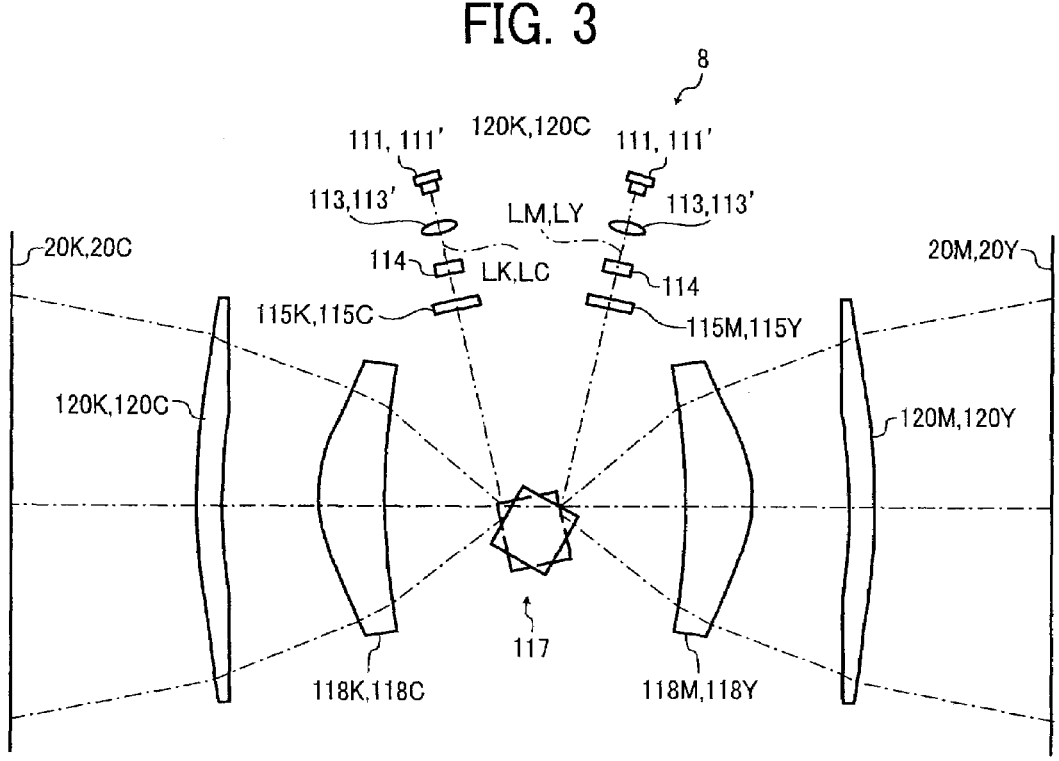
FIG. 3 is another schematic diagram of relevant parts of the optical scanning unit and its peripherals.

FIG. 3 is a schematic diagram of the optical scanning unit 8, viewed from the sub-scanning direction, i.e., the direction parallel to a rotation axis of the optical deflector 117. The right and left direction of the plane of FIG. 3 coincides with that of FIGS. 1 and 2. In FIG. 3, some components of the optical scanning unit 8 that are not shown in FIG. 2 are illustrated; however, some components such as reflection mirrors 119K and 119C that are shown in FIG. 2 are omitted. An optical path from the optical deflector 117 to each of the photosensitive elements 20Y, 20M, 20C, and 20K is depicted almost as a straight line in the FIG. 3 for easy understanding.

Although the optical scanning unit 8 is depicted simplified in FIG. 3, it is clear that the structure of the optical scanning unit 8 is symmetric with respect to the optical deflector 117.

Figure 4:
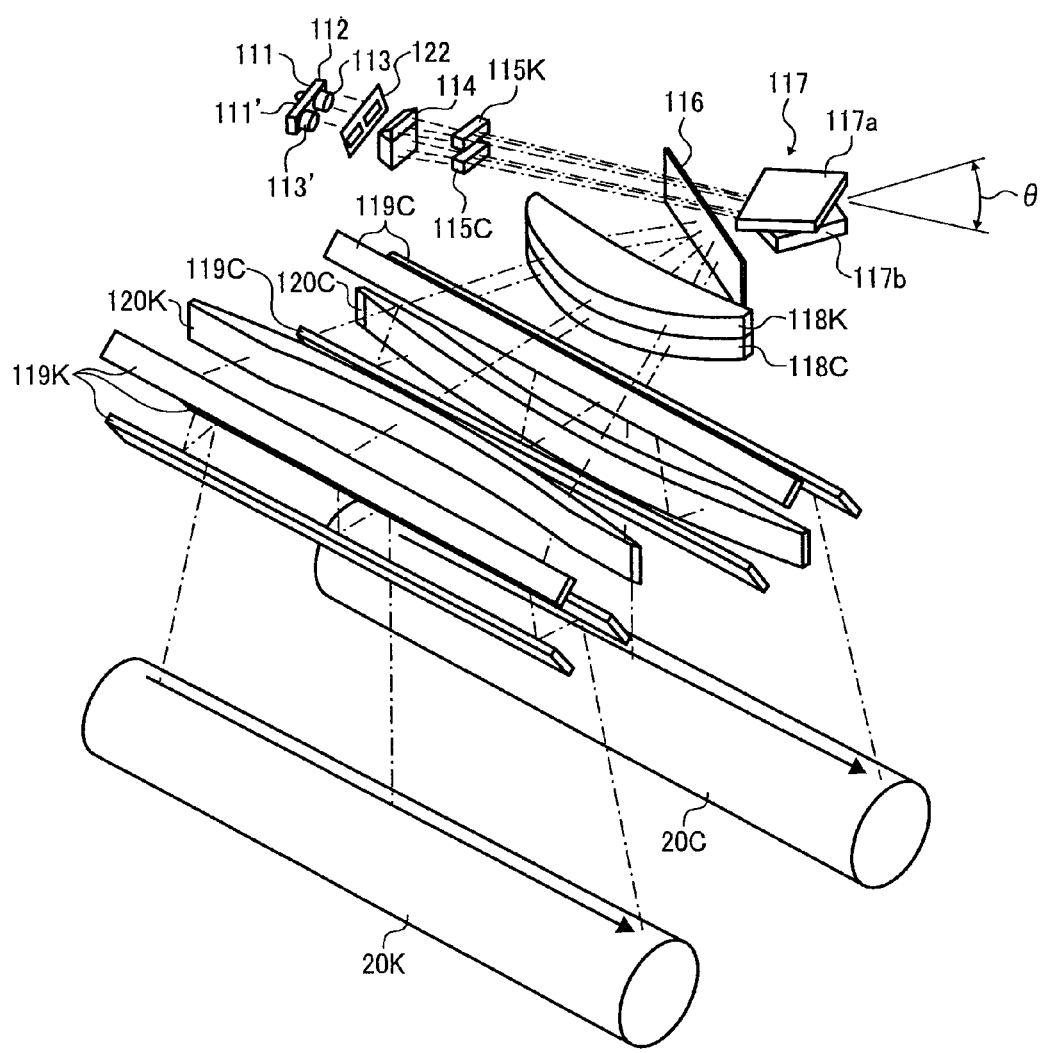
FIG. 4 is a perspective view of a left half of the optical scanning unit.

FIG. 4 is a perspective view illustrating a structure of part of the optical scanning unit 8, specifically, a left side part of the optical scanning unit 8 with respect to the optical deflector 117 in FIG. 2 or 3. As above, because the optical scanning unit 8 has a symmetric structure with respect to the optical deflector 117, only the structure of the left side part is described below with reference to FIG. 4. Components in the right side part corresponding to those in the left side part are shown in FIGS. 2 and 3, and the same description is not repeated.

The optical scanning unit 8 includes laser diodes (LDs) 111 and 111' each of which emits a single light beam. The LDs 111 and 111' form the single light source as a unit. The LDs 111 and 111' are held by a holder 112. The light beams emitted from the LDs 111 and 111' are converted by coupling lenses 113 and 113' to parallel light beams suitable for a subsequent optical system. Each of the coupling lenses 113 and 113' can be designed to convert the light beam to a light beam with low divergence or low convergence depending upon the subsequent optical system.

The parallel light beam having passed through an opening of an aperture 122 is shaped to a light beam with a predetermined width. The shaped light enters a half-mirror prism 114, and is split into two light beams in the sub-scanning direction.

Figure 5:
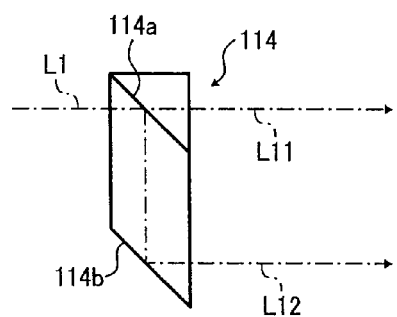
FIG. 5 is an enlarged view of a half-mirror prism shown in FIG. 4.

FIG. 5 is an enlarged view of the half-mirror prism 114. To make the description simpler, only the light beam that is emitted from the LD 111 (hereinafter, "light beam L1") is shown in FIG. 5. The half-mirror prism 114 includes a semi-transparent mirror 114a and a reflecting surface 114b that are arranged parallel to each other in a direction perpendicular to the sub-scanning direction.

The light beam L1 enters the semitransparent mirror 114a, first. Then, a part of the light beam L1 penetrates the semi-transparent mirror 114a, and goes straight out of the half-mirror prism 114, which is called "light beam L11". On the other hand, remaining part of the light beam L1 is reflected from the semitransparent mirror 114a to the reflecting surface 114b, and further reflected totally from the reflecting surface 114b to out of the half-mirror prism 114, which is called "light beam L12". Because the semitransparent mirror 114a and the reflecting surface 114b are parallel to each other, the light beams L11 and L12 are parallel to each other.

In this manner, the light beam L1 emitted from the LD 111 is split into the light beams L11 and L12 in the sub-scanning direction. The other light beam that is emitted from the LD 111' is split into two light beams in the same manner. Thus, in the optical scanning unit 8, the single light source emits the two light beams, and each of the two light beams is split into the two light beams in the sub-scanning direction. That is, the four light beams are obtained in total.

Referring back to FIG. 4, the four light beams enter cylindrical lenses 115K and 115C, and the light beams are focused in the sub-scanning direction by the exertion of the cylindrical lenses 115K and 115C, which is focused near the reflecting surface of the optical deflector 117 to form a line image extended in the main-scanning direction. More particularly, the two light beams, including the light beam L11 shown in FIG. 5, going straight through the semitransparent mirror 114a enter the cylindrical lens 115K, while the other two light beams, including the light beam L12, that are reflected by the semitransparent mirror 114a and the reflecting surface 114b enter the cylindrical lens 115C.

The four light beams enter the optical deflector 117 through a soundproof glass 116; the deflected light beams exit to the scanning/image-forming optical system through the soundproof glass 116. The soundproof glass 116 is provided to cover an opening of a soundproof housing (not shown) of the optical deflector 117. The optical deflector 117 includes a polygon mirror 117a as an upper polygon mirror and a polygon mirror 117b as a lower polygon mirror as a unit. The polygon mirrors 117a and 117b are arranged up and down in the rotation-axis direction. In the present embodiment, the polygon mirrors 117a and 117b have the same shape, and each of them has four deflective-reflecting surfaces. The polygon mirrors 117a and 117b are arranged in such a manner that the deflective-reflecting surfaces of the polygon mirror 117a is deviated from the deflective-reflecting surfaces of the polygon mirror 117a by an angle 0 in the rotating direction. Assume now that 0 is 45 degrees.

The deflected light beams are guided to a corresponding one of the photosensitive elements 20K and 20C by first scanning lenses 118K and 118C, second scanning lenses 120K and 120C, and reflecting mirrors 119K and 119C. More particularly, the first scanning lens 118K, the second scanning lens 120K, and the reflecting mirror 119K guide, which form one unit of the scanning/image-forming optical system, the two light beams deflected by the polygon mirror 117a, i.e., the two light beams that exit from the LDs 111 and 111' and go straight through the semitransparent mirror 114a, onto the photosensitive element 20K, thereby forming two light spots separated in the sub-scanning direction. The first scanning lens 118C, the second scanning lens 120C, and the reflecting mirror 119C guide, which form another unit of the scanning/image-forming optical system, the two light beams deflected by the polygon mirror 117b, i.e., the two light beams that are emitted from the LDs 111 and 111' and reflected by the semitransparent mirror 114a, onto the photosensitive element 20C, thereby forming two light spots separated in the sub-scanning direction.

The optical elements are arranged so that the chief rays of the light beams emitted from the LDs 111 and 111' are intersect with each other near the deflective-reflecting surfaces viewed from the rotation-axis direction of the optical deflector 117. Therefore, each of the pair of the light beams that enter the polygon mirror 117a and the pair of the light beams that enter the polygon mirror 117b forms a divergence angle. That is, viewed from the deflective-reflecting surface to the light source, projection by the pair of the light beams to the surface perpendicular to the rotation axis has a certain angle. The forming of the divergence angle means that the two light spots that are formed on each of the photosensitive elements 20K and 20C are separated in not only the sub-scanning direction but also the main-scanning direction. A synchronous light receiving unit (not shown) such as a photodiode is arranged outside of an effective scanning area. The synchronous light receiving unit individually senses the two light beams for each of the photosensitive elements 20K and 20C to individually adjust timing to start the scanning by the light beams.

In this manner, the photosensitive element 20K is multi-scanned with the two deflected light beams received from the polygon mirror 117a; and the photosensitive element 20C is multi-scanned with the two deflected light beams received from the polygon mirror 117b. Because the deflective-reflecting surfaces of the polygon mirror 117a are deviated from the deflective-reflecting surfaces of the polygon mirror 117b by 45 degrees in the rotation direction, when the photosensitive element 20K is being scanned with the two deflected light beams received from the polygon mirror 117a, the two deflected light beams received from the polygon mirror 117b are not guided to the photosensitive element 20C. On the other hand, when the photosensitive element 20C is being scanned with the two deflected light beams received from the polygon mirror 117b, the two deflected light beams received from the polygon mirror 117a are not guided to the photosensitive element 20K. In other words, the photosensitive elements 20K and 20C are scanned alternately in terms of time.

Figure 6A:
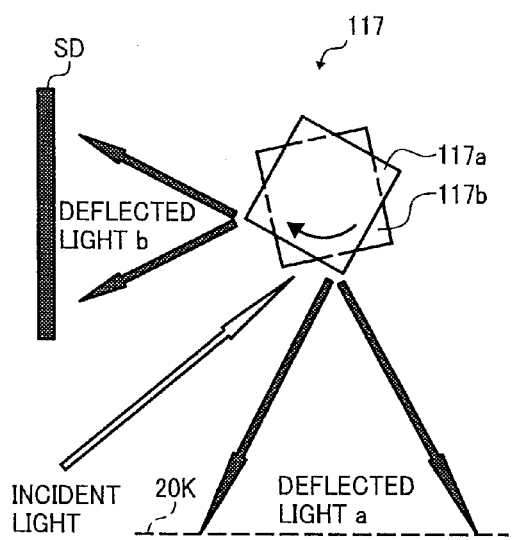
FIGS. 6A and 6B are schematic diagrams for explaining a mechanism of deflective-scanning by a polygon mirror shown in FIG. 4.
Figure 6B:
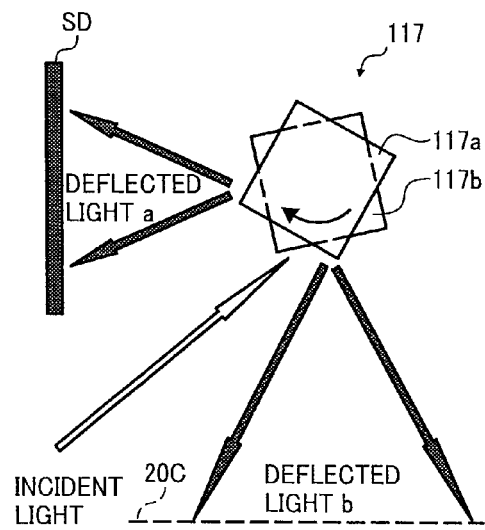

FIGS. 6A and 6B are schematic diagrams for explaining the mechanism of the deflective-scanning by the optical deflector 117. To make the description simpler, the four light beams that enter the optical deflector 117 are shown as incident light indicated by a white arrow. The light beams that are deflected by the optical deflector 117 are shown as deflected lights "a" and "b" indicated by black arrows. The two light beams deflected by the polygon mirror 117a are represented by the deflected light "a"; and the other two light beams deflected by the polygon mirror 117b are represented by the deflected light "b". FIG. 6A is a schematic diagram of a state when the deflected light "a" is guided to the photosensitive element 20K. The deflected light "b" is not guided to the photosensitive element 20C at this state. FIG. 6B is a schematic diagram of a state when the deflected light "b" is guided to the photosensitive element 20C. The deflected light "a" is not guided to the photosensitive element 20K at this state.

It is preferable to arrange a shield member SD such that the deflected light "b" cannot work as stray light while the deflected light "a" is guided to the photosensitive element 20K, and vice versa. This configuration can be implemented just by using a non-reflective wall as an interior wall of the soundproof housing of the optical deflector 117. As described above, the photosensitive elements 20K and 20C are scanned alternately. When the photosensitive element 20K is scanned, the light source emits the light beams that are modulated by the light intensity based on the image signal for black. When the photosensitive element 20C is scanned, the light source emits the light beams that are modulated by the light intensity based on the image signal for cyan. Thus, the electrostatic latent image for black is written onto the photosensitive element 20K, and the electrostatic latent image for cyan is written onto the photosensitive element 20C.

Figure 7:
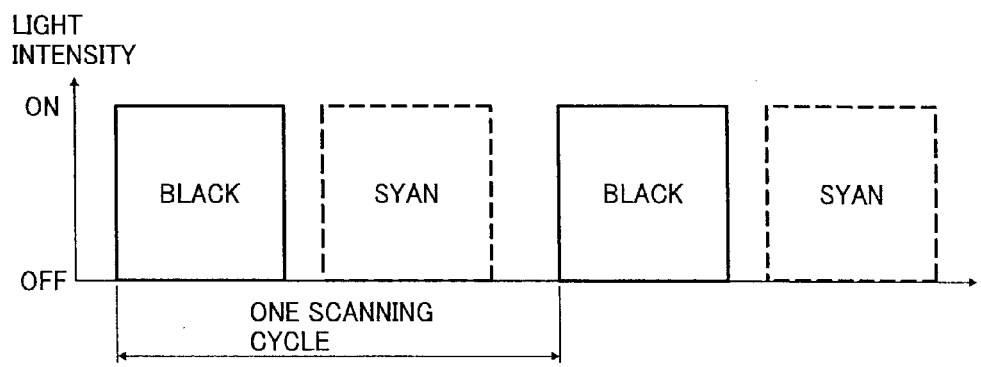
FIG. 7 is a timing chart of writing of electrostatic latent images by the optical scanning unit shown in FIG. 4.

FIG. 7 is a timing chart when the black image and the cyan image are written by using the light beams emitted from the common light source, i.e., the LDs 111 and 111'. To make the description simpler, the LDs 111 and 111' are ON all the time when the effective scanning area is scanned. A full line indicates writing of the black image, and a broken line indicates writing of the cyan image. The synchronous light receiving unit such as a photodiode senses the light beams before the light beams move to a position to start the scanning, and whereby the timing to start writing of the black or cyan image is adjusted based on a signal from the synchronous light receiving unit.

The structure of the optical deflector 117 is described below with reference to FIGS. 8, 9, and 10A and 10B.

The optical deflector 117 includes a rotary body 101 including the polygon mirrors 117a and 117b. The rotary body 101 includes, in addition to the polygon mirrors 117a and 117b, a flange 102c supporting a rotor magnet 103. The flange 102c is fixed by the shrinkage fitting, surrounding a rotation shaft 104. The polygon mirror 117a is connected to the polygon mirror 117b via a linkage member 102f.

The rotary body 101 is molded with aluminum as a unit. Therefore, the polygon mirrors 117a and 117b are tightly connected to each other. Thus, the rotary body 101 generates less noise even during the high-speed rotation. Moreover, the polygon mirrors 117a and 117b scarcely deviate from each other due to acceleration and temperature change.

The rotary body 101 includes the two polygon mirrors 117a and 117b each having the deflective-reflecting surfaces deviated in the rotation direction by the angle 0 as the phase difference in the present embodiment. However, it is allowable to use the polygon mirrors each having the deflective-reflecting surfaces without deviated in the rotation direction.

The rotation shaft 104 is supported by a radial bearing 105. The radial bearing 105 is a fluid dynamic bearing (FDB) impregnated with oil. A gap from the radial bearing 105 is set to 10 micrometers (μm) or smaller. To secure enough stability during the high-speed rotation, the radial bearing 105 is provided with a dynamic pressure groove (not shown) for generating a dynamic pressure. The dynamic pressure groove can be provided to an outer circumference of the rotation shaft 104. However, as taking it into consideration that the radial bearing 105 is made of a sintered material having high workability, it is preferable to provide the dynamic pressure groove to the inner circumference of the radial bearing 105 in the same manner as in the present embodiment.

The rotation shaft 104 is preferably made of, for example, martensitic stainless steel (e.g., SUS420J2) that obtains high hardness on the surface through quenching and having high wear-resistance property. The rotor magnet 103 is fixed to a lower part of an inner surface of the flange 102c. A stator core 107 including a coil 107a is fixed to a bearing housing 106. The rotor magnet 103 and the stator core 107 form as a unit an outer-rotor brushless motor having a magnetic gap in the radial direction. The rotor magnet 103 is a bond magnetic with a resin binder. The outer circumference of the rotor magnet 103 is fixed to the flange 102c tightly such that the break-apart due to a centrifugal force does not occur even during the high-speed rotation. If the rotor magnet 103 is fixed by the pressure fitting, the fixed portion does not move even during the higher-speed rotation and in the higher temperature, which makes it possible to sustain balance of the rotary body 101 with high accuracy.

A thrust bearing 108 supports a convex curved surface 104a that is a bottom surface of the rotation shaft 104. That is, a thrust-directional load of the rotary body 101 and the rotation shaft 104 is supported by the thrust bearing 108 as a pivot bearing. Generation of wear debris from the thrust bearing 108 is suppressed by making the thrust bearing 108 from, for example, a hard material such as martensitic stainless steel, ceramics, and metal subjected to a surface-hardening treatment such as a diamond-like carbon (DLC) or by increasing lubricity by using a resin material or the like. The radial bearing 105 and the thrust bearing 108 are accommodated in the bearing housing 106 sealed with a liquid seal 109 in such a manner that the oil cannot flow out.

The bearing housing 106 is fixed to a circuit board 110 by calking. The calking is a method of mechanically joining two members having the same diameter: one is a convex member and the other is a concave member, by providing a minus tolerance between the two members. The two members are fixed tightly, as compared to various other joining methods. Therefore, the calking is preferable for fixing the bearing housing 106 to the circuit board 110. The radial bearing 105, the thrust bearing 108, and the bearing housing 106 form a bearing unit 130 that supports the rotation shaft 104 rotatably against the circuit board 110. In other words, the bearing unit 130 supports the rotary body 101 via the rotation shaft 104 rotatably against the circuit board 110.

If the rotary body 101 rotates at high speed, for example, at 25,000 revolutions per minute (rpm) or higher, to suppress the vibration to a low level it is necessary to accurately adjust and keep the balance of the rotary body 101. There are two points for adjusting the balance of the rotary body 101: one is an upper concave area 102d that extends circumferentially on an upper surface of the rotary body 101, and the other is a lower concave area 102e that extends circumferentially on a lower surface of the rotary body 101. The balance adjustment is performed by applying an adhesive to the upper concave area 102d and the lower concave area 102e. A required unbalance amount is 10 mg·mm or lower. For example, an adjustment amount on an area that is 10 millimeters (mm) from the center in a radial direction is 1 milligram (mg) or lower. If it is difficult to adjust such a fine amount with the adhesive or it has a possibility that the adhesive comes off during the high-speed rotation, for example, at 40,000 rpm because the amount of the applied adhesive is not enough, it is preferable to adjust the balance by removing a part of the rotary body 101 by cutting with a drill or laser processing.

The rotation of the rotary body 101 is controlled by a driving integrated circuit (IC) 132. More particularly, to rotate the rotary body 101, the driving IC 132 performs excitation switching of the coil 107a based on a positional signal from a hall element 140 provided to the circuit board 110 by the exertion of the magnetic field of the rotor magnet 103. The rotor magnet 103, which is magnetized in the circumferential direction, rotates by a torque that is generated by the exertion between the rotor magnet 103 and the outer circumference of the stator core 107. The magnetic path of the rotor magnet 103 is closed to the inner diameter direction, while opened to the other directions, i.e., the up-and-down directions and the outer diameter direction. The hall element 140 is arranged in any of the open magnetic paths. A connector 133 that is connected to a harness (not shown) transmits from the main body 99 the electric power and various control signals such as a signal for activation/stop of the motor, a signal for the number of revolutions, etc. With this motor configuration, the rotary body 101 is driven to rotate around the rotation shaft 104 together with the rotation shaft 104. In other words, the rotation shaft 104 is arranged at the center of the rotary body 101, rotating together with the rotary body 101.

Figure 11:
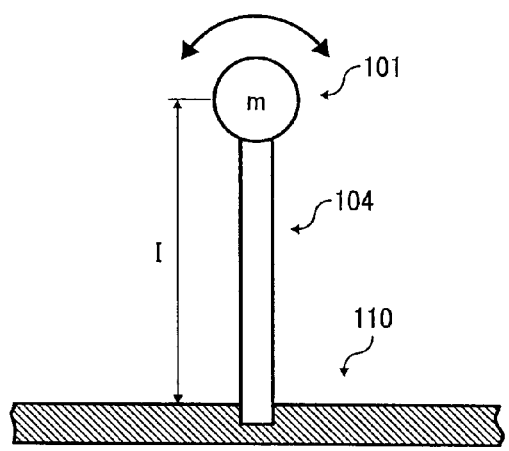
FIG. 11 is a conceptual diagram of a modeled structure of the optical deflector shown in FIG. 8.

From the viewpoint of vibration, the optical deflector 117 having the above configuration can be assumed to as a vibration system shown in FIG. 11 including a cantilever with a ball weight on one end. First-mode natural frequency f of the cantilever in the lateral direction is calculated by Equation (1):

$$f = \frac{1}{2\pi}\sqrt{\frac{3\pi E r^4}{4 \, \mathrm{ml}^3}} \qquad (1)$$

where r [meter (m)] is radius of the rotation shaft 104, E [pascal (Pa)] is Young's modulus, m [kilogram (kg)] is mass of the rotary body 101, and l [m] is distance between the center of gravity of the rotary body 101 and the circuit board 110. Even if the polygon mirror and the flange are separated members, a total mass of the optical deflector including the polygon mirror and the flange is calculated as the mass m. As a result of the calculation by using Equation (1), the natural frequency f of the rotary body 101 according to the present embodiment is 782 hertz (Hz).

Figure 10A:
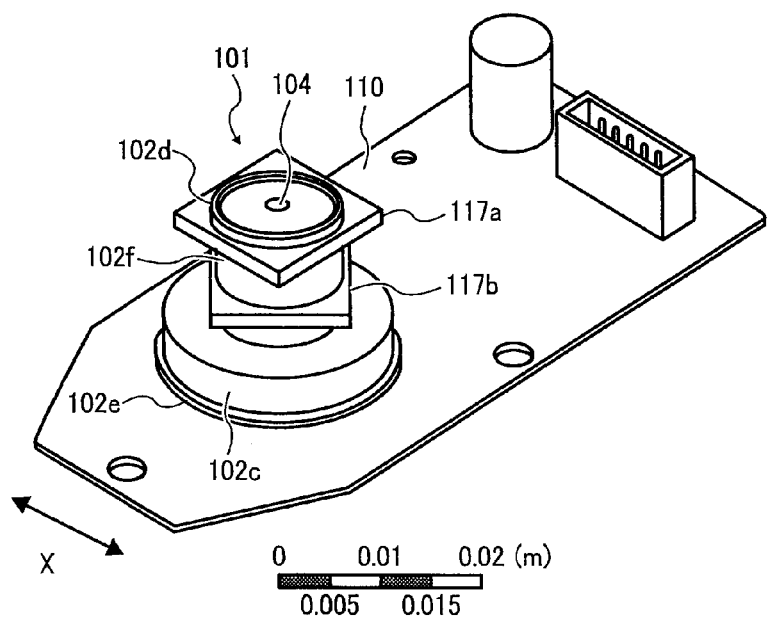
FIG. 10A is a perspective view of the optical deflector.
Figure 10B:
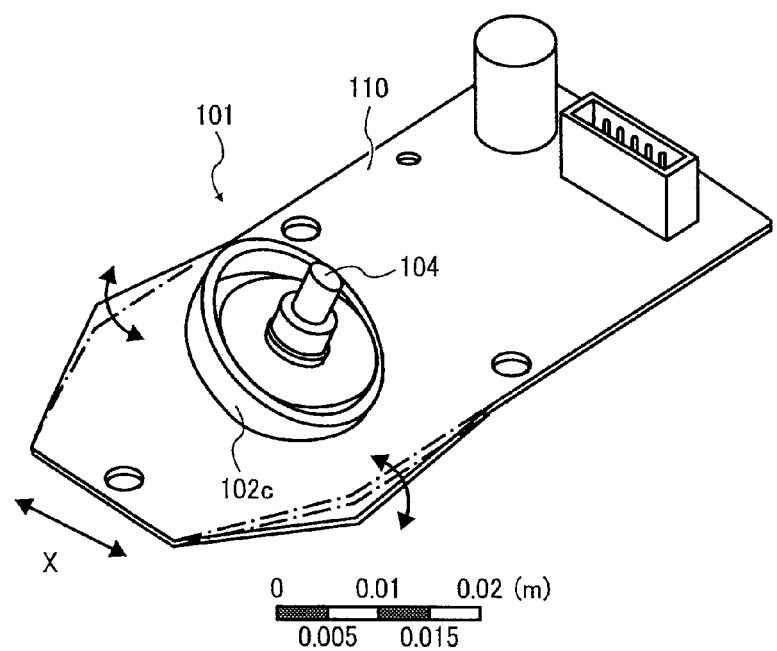
FIG. 10B is a perspective view of relevant parts of the optical deflector when resonance occurs.
Figure 12:
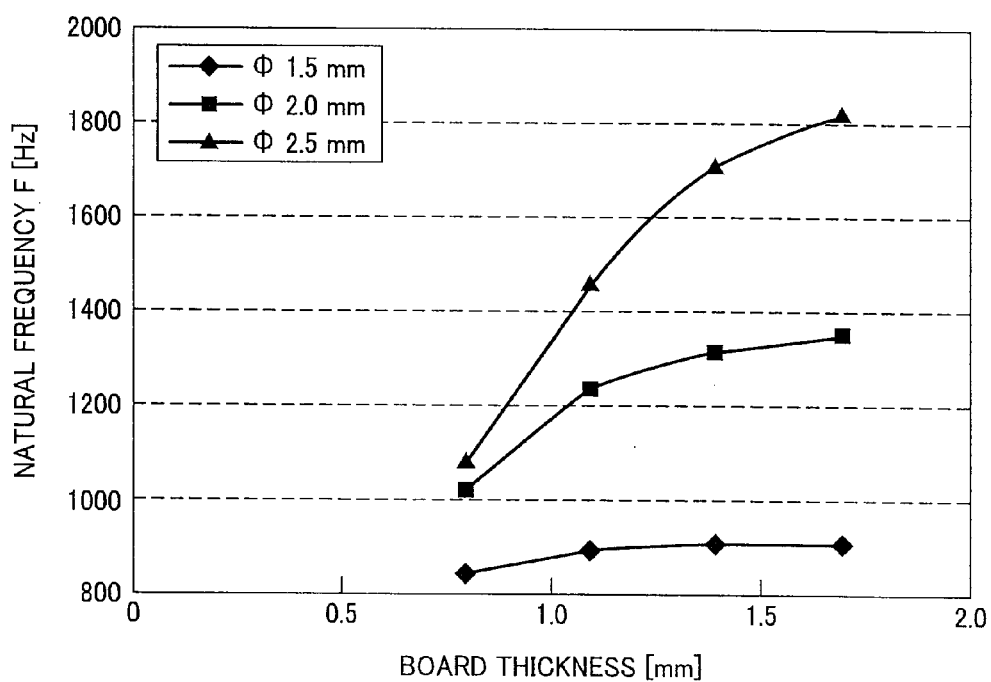
FIG. 12 is a graph of a relation between board thickness and natural frequency of the optical deflector shown in FIG. 8.

FIG. 12 is a graph of natural frequency F of the optical deflector 117 as results of analysis. FIGS. 10A and 10B are perspective views of the small-size rotary body 101 capable of rotating at the high speed, i.e., 60,000 rpm at the highest. It is noted that the entire part of the rotary body 101 and the rotation shaft 104 is not shown in FIG. 10B. Assume now that the thickness of the circuit board 110 is 0.8 mm, and the radius of the rotation shaft 104 is 1 mm.

It is clear from FIG. 12 that the natural frequency F of the optical deflector 117 is 1,016 Hz. If the rotary body 101 rotates at 60,000 rpm, the rotary body 101 will vibrate, as shown in FIG. 10B, in a direction indicated by an X arrow, i.e., parallel to a shorter side of the circuit board 110 with the base position at which the bearing housing 106 is fixed to the circuit board 110 as the center of the vibration. This strong vibration is caused by resonance. When the rotary body 101 rotates at 60,000 rpm, the rotation frequency marks 1,000 Hz, which is close to the natural frequency f of 1,016 Hz, and therefore the resonance occurs. The strong vibration may lead to deviation in the scanning, which results in the low image quality.

In general, to free from the adverse effects of the resonance, the natural frequency F preferably satisfies the following Inequality (2):

$$F > \sqrt{2} \times \frac{P}{60} \quad (2)$$

where P [rpm] is the number of revolutions. It is clear from Inequality (2) that if the optical deflector 117 rotates at 60,000 rpm, the natural frequency F of the optical deflector 117 needs to be 1,410 Hz or higher.

The natural frequency f of the rotary body 101 that is calculated by Equation (1) is 782 Hz, which is lower than the natural frequency F of the optical deflector 117 of 1,016 Hz. The value of 782 Hz indicates the natural frequency of the rotary body 101 that rotates together with the rotation shaft 104. Actually, the rotary body 101 is accommodated in the bearing housing 106. Therefore, the natural frequency F of the optical deflector 117 including the other components such as the circuit board 110 is increased to about 1,000 Hz. In other words, although the resonance point of the rotary body 101 is lower than 1,000 Hz, the rotary body 101 is supported by the bearing housing 106 and the circuit board 110.

The natural frequency F is higher than the natural frequency f, in general. However, if it is assumed that the natural frequency F is close to the natural frequency f, the following Inequality (3) is obtained from Equation (1) and Inequality (2):

$$\frac{1}{2\pi} \sqrt{\frac{3\pi E r^4}{4\, \text{ml}^3}} \leq \sqrt{2} \times \frac{P}{60} \quad (3)$$

In general, the rotation shaft 104 is made of a rigid material (e.g., SUS420 and iron) having the Young's modulus from $1.9 \times 10^{11}$ Pa to $2.1 \times 10^{11}$ Pa. If the Young's modulus E is $1.9 \times 10^{11}$ Pa, the following Inequality (4) is obtained from Inequality (3):

$$\frac{1}{2\pi} \sqrt{\frac{3\pi r^4}{4\, \text{ml}^3}} \leq 5.41 \times 10^{-8} \times P \quad (4)$$

However, the natural frequency F is higher than the natural frequency f, in actual. Therefore, to prevent the resonance due to self-induced vibration and maintain the high image quality, it is necessary to increase the natural frequency F of the optical deflector 117.

There are two approaches to increase the natural frequency F of the optical deflector 117. The first approach is to increase the natural frequency f of the rotary body 101. The second approach is to increase strength of the circuit board 110 that supports the vibration source, i.e., the rotary body 101.

Use of a shaft with a larger diameter as the rotation shaft 104 is effective to increase the natural frequency f of the rotary body 101. If the radius r of the rotation shaft 104 is increased from 1 mm to 1.25 mm, the natural frequency f that is calculated by Equation (1) is increased from 782 Hz to 1,222 Hz. However, the natural frequency f is lower than the target value of 1,410 Hz.

The more the radius r increases, the more the natural frequency f increases. However, the too-large radius r brings about the following disadvantages: 1. increase of bearing loss, 2. increase of power consumption due to increase in size of the rotary body 101, and 3. increase of possibility to make a fissure on the rotor magnet 103 due to the centrifugal force because the radius of the rotor magnet 103 needs to be increased as the radius of the rotary body 101 is increased.

The inventors actually produced the optical deflector 117 including the rotation shaft 104 having the radius r of 1.5 mm, and activated the produced optical deflector 117. The rotor magnet 103 fissured, while the optical deflector 117 rotated at high speed. On the other hand, to obtain the strength enough to support the rotary body 101, the radius r of the rotation shaft 104 needs to be 0.75 mm or larger. Therefore, from the viewpoint of the measurements to increase the natural frequency, the radius r of the rotation shaft 104 is preferably in a range of 0.75 mm≦r<1.5 mm.

The extent to which the diameter of the rotation shaft 104 can be increased has the upper limit as described above. Therefore, measurements to increase the strength of the circuit board 110 are described below.

FIG. 12 is the graph of a relation between natural frequency F and thickness of the circuit board 110. It is clear from the graph that the natural frequency F increases as the thickness of the circuit board 110 increases. When the board thickness is increased from 0.8 mm to 1.1 mm, the natural frequency F is increased by about 200 Hz if the radius r of the rotation shaft 104 is 1.0 mm (i.e., shaft diameter is 2.0 mm) and by about 400 Hz if the radius r of the rotation shaft 104 is 1.25 mm (i.e., shaft diameter is 2.5 mm). This is because the increase of the thickness of the circuit board 110 results in increase in the strength of the base that supports the vibration source.

From the viewpoint of the balance between the strength and the costs, the circuit board 110 is preferably an iron board with thickness t in a range of 0.6 mm<t<0.9 mm. However, to endure the high-speed rotation, it is necessary to set the thickness t of the circuit board 110 to a higher value than ordinal. Moreover, if the radius r is 1.0 mm (shaft diameter is 2.0 mm), the natural frequency F is saturated at the board thickness of about 1.7 mm. Taking into consideration the cost increase and the above factors, as the measurements to increase the natural frequency and suppress the self-induced vibration, it is preferable to set the board thickness t in a range of 0.8 mm≦t<1.8 mm (hereinafter, "Inequality (5)").

It is preferable to use an iron board as the circuit board 110 from the viewpoint of the costs and the strength. Taking into consideration that the Young's modulus of the iron board is 206 gigapascals (GPa), the Young's modulus H of the circuit board 110 is preferably higher than 200 GPa. Moreover, it is more preferable to use an iron board coated with zinc having resistance to corrosion.

The high speed at which the rotary body 101 rotates is 60,000 rpm in the present embodiment. This value is assumed to be the highest speed at the current stage. It is allowable to assume any speed as the high speed.

From among various cases shown in FIG. 12, the natural frequency F marks the lowest, i.e., about 800 Hz when the radius r of the rotation shaft 104 is 0.75 mm (i.e., shaft diameter is 1.5 mm) and the thickness t of the circuit board 110 is 0.8 mm. Even if the natural frequency F is 800 Hz, the upper limit, which is calculated by Inequality (2), within which the rotary body 101 can rotate stably without occurrence of the resonance is about 34,000 rpm. This means that the upper limit is enough higher than 20,000 rpm, which is assumed as the high speed in general.

From among various cases shown in FIG. 12, the natural frequency F marks the highest, i.e., about 1,800 Hz when the radius r of the rotation shaft 104 is 1.25 mm (i.e., shaft diameter is 2.5 mm) and the thickness t of the circuit board 110 is 1.8 mm. If the natural frequency F is 1,800 Hz, the upper limit, which is calculated by Inequality (2), within which the rotary body 101 can rotate stably without occurrence of the resonance is about 73,550 rpm. This means that the upper limit is enough higher than 60,000 rpm, which is assumed as the highest speed at the current stage.

The optical deflector 117 is produced to satisfy Inequality (3) or (4) and Inequality (5), etc. The produced optical deflector 117 is incorporated in the optical scanning unit 8, and the optical scanning unit 8 is incorporated in the image forming apparatus 100. With this configuration, the electrostatic latent images are written onto the photosensitive elements 20Y, 20M, 20C, and 20K in a uniform and high-precision manner, and the image forming apparatus 100 can form a high-quality image.

The present invention is not limited to the above embodiments and can be variously modified and changed within the scope of the present invention.

The optical deflector 117 according to the above embodiment uses the multi-beam system. More particularly, the light source emits two beams to the polygon mirror; the optical system including the polygon mirror guides two beams to each scan target surface in such a manner that the two beams are adjacent to each other, thereby writing the electrostatic latent image onto each photosensitive element. However, the single-beam can be used instead of the multi-beam system. More particularly, the light source emits a single beam to the polygon mirror; the optical system including the polygon mirror guides the beam to each scan target surface, thereby writing the electrostatic latent image onto each photosensitive element.

A single-drum image forming apparatus can be used instead of the tandem-type image forming apparatus. The single-drum image forming apparatus includes only one photosensitive element. The four toner images are sequentially formed on the photosensitive element, and sequentially superimposed to one another to form the full-color image. Moreover, the image forming apparatus can form only a single color image.

Furthermore, the image forming apparatus of any of the above types can transfer the four toner images directly onto a sheet, for example, the recording sheet S, skipping the process of transferring the four toner images onto the intermediate transfer medium. The four toner images are transferred from the four image carriers directly to the sheet while the sheet is being conveyed by, for example, a conveyer belt.

The MFP having various functions including a copier, a printer, and a facsimile machine is used as the image forming apparatus in the above embodiment. However, it is allowable to use any of a copier, a printer, a facsimile and an MFP having a different functional combination.

According to an aspect of the present invention, beams can be deflected with high accuracy, which results in scanning a photosensitive element with high accuracy, thereby enabling to a high-quality image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical deflector comprising:
a rotary body that includes a polygon mirror;
a rotation shaft that is fixed to the rotary body and rotates together with the rotary body;
a bearing unit that rotatably supports the rotation shaft; and
a board to which the bearing unit is fixed, wherein
the following inequalities are satisfied:

$$\frac{1}{2\pi}\sqrt{\frac{3\pi Er^4}{4\,ml^3}} \le \sqrt{2} \times \frac{P}{60} \text{ and } 0.8 \le t \le 1.8,$$

where P [revolution per minute] is number of revolutions of the rotary body, l [meter] is a distance between a center of gravity of the rotary body and the board, m [kilogram] is mass of the rotary body, r [meter] is a radius of the rotation shaft, E [pascal] is Young's modulus of the rotation shaft, and t [millimeter] is a thickness of the board.

2. The optical deflector according to claim 1, wherein the bearing unit is fixed to the board by calking.

3. The optical deflector according to claim 1, wherein $0.75 \le r < 1.5$.

4. The optical deflector according to claim 1, wherein Young's modulus of the board is higher than 200 gigapascals.

5. The optical deflector according to claim 1, wherein the board is made of iron.

6. An optical scanner comprising:
the optical deflector according to claim 1;
a light source that emits a beam to the polygon mirror; and
an optical system, wherein
the optical system and the optical deflector guide the beam to a scan target surface by rotation of the rotary body to scan the scan target surface.

7. The optical scanner according to claim 6, wherein
the light source emits a plurality of beams to the polygon mirror, and
the optical system and the polygon mirror guide the beams to different positions adjacent to each other on the scan target surface to scan the scan target surface.

8. An image forming apparatus comprising:
the optical scanner according to claim 6; and
an image carrier that includes the scan target surface on which a latent image is formed through scanning by the optical scanner.

9. An optical deflector comprising:
a rotary body that includes a polygon mirror;
a rotation shaft that is fixed to the rotary body and rotates together with the rotary body;
a bearing unit that rotatably supports the rotation shaft; and
a board to which the bearing unit is fixed, wherein the following inequalities are satisfied:

$$\frac{1}{2\pi}\sqrt{\frac{3\pi r^4}{4\,ml^3}} \leq 5.41\times 10^{-8}\times P \text{ and } 0.8 \leq t \leq 1.8, \quad (5)$$

where P [revolution per minute] is number of revolutions of the rotary body, l [meter] is a distance between a center of gravity of the rotary body and the board, m [kilogram] is mass of the rotary body, r [meter] is a radius of the rotation shaft, and t [millimeter] is a thickness of the board.

10. The optical deflector according to claim 9, wherein the bearing unit is fixed to the board by calking.

11. The optical deflector according to claim 9, wherein $0.75 \leq r < 1.5$.

12. The optical deflector according to claim 9, wherein Young's modulus of the board is higher than 200 gigapascals.

13. The optical deflector according to claim 9, wherein the board is made of iron.

14. An optical scanner comprising:
the optical deflector according to claim 9;
a light source that emits a beam to the polygon mirror; and
an optical system, wherein
the optical system and the optical deflector guide the beam to a scan target surface by rotation of the rotary body to scan the scan target surface.

15. The optical scanner according to claim 14, wherein
the light source emits a plurality of beams to the polygon mirror, and
the optical system and the polygon mirror guide the beams to different positions adjacent to each other on the scan target surface to scan the scan target surface.

16. An image forming apparatus comprising:
the optical scanner according to claim 14; and
an image carrier that includes the scan target surface on which a latent image is formed through scanning by the optical scanner.]

* * * * *

UNITED STATES PATENT AND TRADEMARK OFFICE
CERTIFICATE OF CORRECTION

PATENT NO. : 7,602,540 B2  Page 1 of 1
APPLICATION NO. : 12/370019
DATED : October 13, 2009
INVENTOR(S) : Masuda et al.

It is certified that error appears in the above-identified patent and that said Letters Patent is hereby corrected as shown below:

On the title page, Item (73), the Assignees' information is incorrect. Item (73) should read:

-- (73) Assignee:  Ricoh Company Limited, Tokyo (JP);
 Tohoku Ricoh Co., Ltd., Shibata-gun (JP) --

Signed and Sealed this

Twenty-fourth Day of November, 2009

David J. Kappos
*Director of the United States Patent and Trademark Office*